United States Patent [19]
Lavelle et al.

[11] Patent Number: 5,410,144
[45] Date of Patent: Apr. 25, 1995

[54] RADIOGRAPH DIGITIZER

[75] Inventors: Christopher L. B. Lavelle; Chuang-Jy Wu, both of Manitoba, Canada

[73] Assignee: DACIM Laboratory Inc., Winnipeg, Canada

[21] Appl. No.: 155,233

[22] Filed: Nov. 22, 1993

[51] Int. Cl.$^6$ ............................................. H04N 1/04
[52] U.S. Cl. .................................. 250/208.1; 358/487
[58] Field of Search ................... 250/208.1; 358/482, 358/483, 487

[56] References Cited

U.S. PATENT DOCUMENTS

| | | | |
|---|---|---|---|
| 3,629,495 | 12/1971 | Cahill | 358/487 |
| 5,093,738 | 3/1992 | Gerlach | 358/487 |
| 5,241,406 | 8/1993 | Johnston et al. | 358/487 |

Primary Examiner—Stephone B. Allen
Attorney, Agent, or Firm—Adrian D. Battison; Stanley G. Ade; Murray E. Thrift

[57] ABSTRACT

A dental film-based radiograph which is relatively small of the order of 40 mm by 30 mm is scanned and converted to a digital image by mounting the radiograph on a table movable in a single direction at a transparent aperture of the table and by transmitting through the radiograph a beam of laser light from a line source with the line parallel to the radiograph and defining a collimated beam of parallel light at right angles to the line and lying in a single plane containing the line. A detector in the form of a linear array of CCD detector elements is arranged in the plane to receive the light passing through the radiograph. The whole is contained in an enclosure to exclude ambient light. The scanning movement can be effected step by step or continuously with the laser source pulsed.

10 Claims, 1 Drawing Sheet

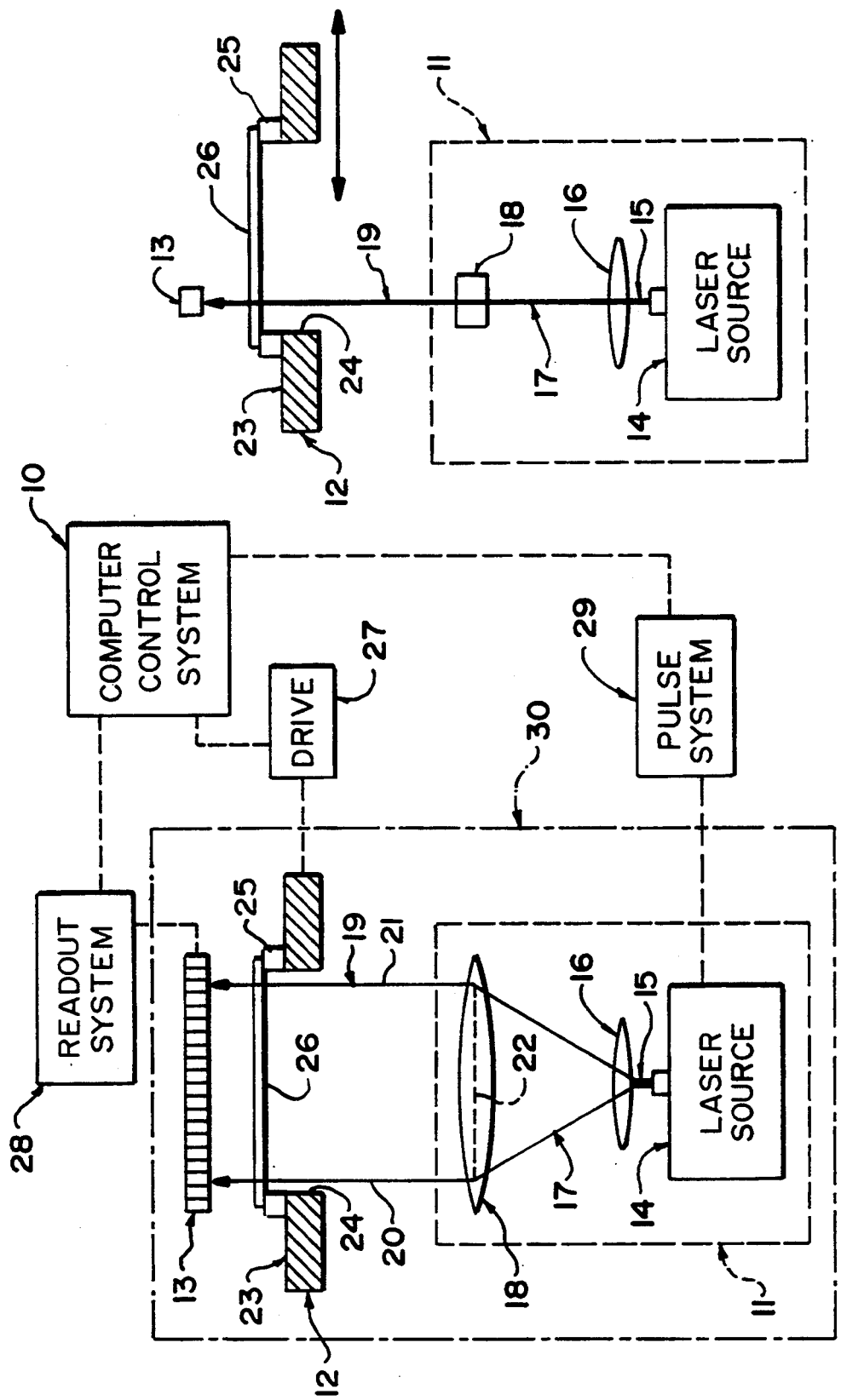

RADIOGRAPH DIGITIZER

This invention relates to a new and useful radiographic digitizer that converts conventional dental radiographs to precise digital images.

BACKGROUND OF THE INVENTION

Recent progress in digital signal processing and computer technology has been closely correlated with the increased demands for computer assisted radiographic processing in the health-care field. Technologic limitations unfortunately restrict the conversion of regular medical radiographs to high spatial resolution digital images. High resolution digital images can, however, be derived from dental or other radiographs several inches in size. Most of the existing high spatial resolution digitizers (e.g. the CCD video camera, the CCD scanner for the desk top publishing or the x-ray fluorescence plate with laser beam scanner) suffer from similar problems of unacceptable feature position accuracy, poor gray level reproduction, high costs and suitable for only particular applications. Such concerns limit their general health care applications.

Radiographs serve as invaluable adjuncts to dental treatment planning and progress assessments, in addition to providing records for subsequent referral. They are traditionally examined by dentists (or specialists) with minimal assistance, except for the occasional use of some form of magnifying device. Dental radiographic assessments are therefore largely subjective, primarily dependent on the clinician's prior experience. In the cases where contrasts are small (e.g. incipient carious lesions), the objects are small and irregular (e.g. apex of a tooth during root canal therapy) or the changes between sequential radiographs are incremental (e.g. alveolar bone changes following periodontal therapy). Quantitative diagnoses or evaluations are often difficult by simple visual inspection.

With recent advances in digital image processing and computer technology, clinicians have demanded computer aided radiographic processing to assist their diagnoses (e.g. cardiography, mammography). In a dental setting, the diagnostic and evaluative contributions of conventional radiographs can be extended by the application of precise image enhancement techniques. This is particularly important, since film-based radiographs are unlikely to be replaced as diagnostic or evaluative tools in the near to medium-term future, i.e. alternative imaging systems, e.g. ultrasound and other forms of imaging, are unlikely to rival the cost efficiency of dental radiographs.

The research literature contained in the 164 research papers published in 1992 illustrates the immense potential by employing the digital image technology to routine clinical dental practice. If capital costs can be reduced, such advances will be available to clinical practice, rather than being confined to the research laboratory.

Traditional radiographs must be converted to digital images prior to the application of computer-aided image processing techniques. But whereas such techniques can improve image sharpness and reduce extraneous noise (FIG. 1), the equipment is expensive and difficult to use. As a consequence, digital image processing techniques are largely confined to the research laboratory, and practicing dentists must continue to rely upon crude techniques for radiographic image magnification. The lack of clear radiographic images also restricts their value in patient communication.

The principal determinants impacting on the quality of a radiographic image include image noise, image sharpness and image distortion. The relationships between each of these determinants are, however, complex. For instance, the image blur is a function of receptor spatial resolution, whereas image contrast is a function of receptor amplitude response. Digital images also suffer from additional quality degradation during the conversion from the analog, continuous form to digital format.

Many forms of commercial equipment can be used to convert radiograph to digital images. Examples include commercial video cameras, image scanners for desk top publishing, image scanners for mammography, x-ray fluorescence storage plate with laser scanner, etc. Yet all these device have a number of inherent problems. For instance, the x-ray fluorescence storage plate is bulky, expensive and unsuitable for routine dental radiography. The image scanner has many advantages compared to video cameras, e.g. a better dynamic range in the image gray level and better spatial resolution. Yet it suffers unacceptable geometric distortion due to an inaccurate scanning process. Both the image scanner and video camera suffer from distortion in duplicating the radiographic optical density readings. This is caused mainly by the CCD dark current, the scattered diffusing light and the analog to digital converter (8-bit) 256 gray level constraint. The mammograph laser scanner has very good linear relationship between the film optical density and the digital image gray level, but suffers the inaccurate feature position reproduction. This deficiency is of no consequence for mammograms, where positioning has little diagnostic consequence.

The simplest digitization method involves the use of a CCD (Charge-Coupled-Device) camera (i.e. a commercial video camera, camcorder or equivalent) to project the radiograph onto the camera image plane. Unfortunately, commercial video cameras have many shortcomings, severely limiting the resultant digital image quality and consequent quantitative accuracy. Such limitations applied to radiographic digitization include the following:

(i). Low spatial resolution:

The image plane of a commercial video camera comprises an area array of CCD elements of approximately $600 \times 480$. Each element has nominal size of $10 \, \mu m \times 10 \, \mu m$ (element size is in the 6 to 20 $\mu m$ range depending on the manufacturer and the model number, and elements may be occasionally rectangular instead of square). The resultant digitized image is therefore represented by $600 \times 480$ squares, with the amplitude of each square being the average of the original image at the corresponding area. If the original document is $40 \times 30$ mm, the spatial resolution for such digital image is approximately 67 $\mu m$.

The first technique for improving the spatial resolution of a video-based system involves the use of a large CCD area array, say $2048 \times 2048$, but the equipment costs become a major concern. Whereas a commercial video camera can be purchased for approximately $1,000 and a $2048 \times 2048$ CCD camera costs approximately $20,000.

Alternatively, spatial resolution can be enhanced by reducing the area covered. With this technique, the original document will comprise a series of multiple digital images. A precision mechanical setup is then required to combine such multiple digital images to a single image.

(ii). Low dynamic range:

Because of the video camera design specification, the CCD element amplitude response dynamic range is usually around 3,000:1 or lower and it gives poor contrast. The resultant digital image gray level has no variations at densities greater than 1 ODU (optical density units). Secondly, the scattered diffusing light from radiograph illumination increases the CCD camera background noise, subsequently reducing the dynamic range. Thirdly, the dark current accumulated in the CCD element due to the time delay between the exposure and the reading is very high which degrades the dynamic range. (For example, if the CCD array has a maximum frame rate of 100 frames per sec, typical frame speed is much less, the time delay between the exposure and the reading of last CCD element is 10 msec. This is a very long delay.)

(iii). Timing errors:

In order to read the CCD elements efficiently and rapidly, each must be read line by line. Timing jitters in reading the CCD array and/or converting the analog to the digital signal will lead to the digital image distortion. A displacement of a few pixels between each line is not uncommon, whereas keeping the timing error to less than one pixel is not a simple inexpensive task.

(iv). Defective CCD elements:

Manufacturers are currently capable of supplying zero defective elements for an area array size of $512 \times 512$, whereas the industrial standard of a scientific grade area array of $1024 \times 1024$ elements has 10 defective elements, A zero defective element in a $2048 \times 2048$ array would be extremely difficult to delineate with current technology and very expensive. For instance, a scientific grade CCD area array of $2048 \times 2048$ may have less than 150 defective pixels compared to 600 defective pixels for the commercial grade. Such scientific grade systems cost two to three times more (i.e. $40-60,000).

Based on the above, therefore, an accurate and economically viable radiograph digitizer is not feasible at this time, despite the obvious clinical demands. The majority of published research reports dealing with various forms of digital image processing technology are confined to the research laboratory: the advantages of such technology is not yet available to the dentist, due to the high associated costs.

SUMMARY OF THE INVENTION

It is one object of the present invention therefore to provide a method of converting conventional dental radiograph into a digital image.

According to the invention therefore there is provided a method for converting a conventional dental radiograph into a digital image comprising generating a beam of light from a laser source in the form of a line of a predetermined length with the light being emitted from the line substantially in a single plane containing the line and in a direction at right angles to the line such that the light is collimated, passing the beam of light through the radiograph in a direction substantially at right-angles thereto from one side thereof, providing a detector on an opposed side of the radiograph having an array of detector elements lying in said plane so as to be responsive to the light from the beam passing through the radiograph to emit a digital signal proportional to the amplitude of the light detected, generating relative movement between the radiograph and the beam such that the beam is scanned across the radiograph, and storing the digital signals emitted by the detector elements in signal reading means to generate said digital image. The spatial resolution of the said digital image is equal to the CCD detector size.

If an appropriate lens system is inserted between the radiograph and the CCD detector, the spatial resolution of the said digital image will be changed according to the lens characteristics. The table movement in the case will be adjusted accordingly. For instance, the X-Y table, i.e. the radiograph, will move 13 $\mu$m between successive scans if the CCD detector is 14 $\mu$m square. If a magnifying lens with magnification factor 1 is inserted between the radiograph and the detector, the X-Y table will move 7 $\mu$m between successive scans.

Recent developments in memory storage and laser technology offer the potential for quantum improvements in the capability for image enhancement. Automated user-friendly systems can be developed at a fraction of the cost of existing systems. The facility for image enhancement is therefore potentially available to all dentists.

The device for dental radiographic digitization is based on innovative technology that emulates a high-quality video camera. The proposed system is primarily a high spatial resolution and economically viable radiographic digitizer. It consists of a CCD camera, a X-Y table, a laser subsystem, a data acquisition subsystem and a PC computer to control all subsystems.

One embodiment of the invention will now be described in conjunction with the accompanying drawings, in which:

BRIEF DESCRIPTION OF THE DRAWINGS

FIG. 1 is a schematic illustration of the system of the present invention taken in front elevation.

FIG. 2 is a similar schematic illustration taken in side elevational view.

DETAILED DESCRIPTION

The apparatus of the present invention comprises a central computer control system 10, a light source 11, a radiograph sample support and translation system 12 and a detector array 13.

The light source 11 comprises a conventional laser light source 14 for generating an output beam of coherent light as indicated at 15. A first lens system 16 shown only schematically collimates the beam into a single plane 17 of light. The plane of light of course has a finite depth but this is kept to a minimum and in a preferred arrangement the depth of the plane of light is of the order of 1 mm. In this plane of light, the light diverges from the first lens system in a V-shape visible in FIG. 1. A second lens system 18 again shown only schematically acts upon the plane of light which is diverging to form that plane of light into a beam 19 in which the light emerges from the lens system so that the light is mutually parallel to side edges 20 and 21 of the beam.

The light source therefore has the effect of forming an imaginary line source 22 at the second lens system 18 with the light emerging from that line source 22 in a direction at right angles to the line and lying in the plane 17.

The details of the lens system are not shown herein as these are known to one skilled in the art. While a light source of this type is presently not believed to be commercially available, a light source of this type can be readily manufactured by various lens manufacturers and in one example such a light source is manufactured by Cyben Optics, Minneapolis, Minn., U.S.A.

The sample support and drive system 12 comprises a table 23 mounted in a direction at right angles to the plane 17. The table 23 has an aperture 24 at which is mounted a sample support bracket system 25 again shown only schematically. This allows a sample radiograph 26 to be located at the aperture 24. The dimensions of the aperture are arranged such that the beam 19 passes through the aperture and such that the aperture is approximately the same size in size as the information on the radiograph to be observed. A drive system 27 actuates movement of the table 23 in a direction at right angles to the beam 19, the drive motor system 27 being of the currently commercially available type which provides highly accurate continuous or step movement of the table.

The detector 13 comprises a single linear array of detector elements of the CCD type. The length of the array is substantially equal to the width of the radiograph. The array is arranged so as to lie directly in the plane 17 of the beam 19. The array is mounted on a suitable support system holding the array in fixed position relative to the light source and therefore the beam 19. The beam 19 and the array are therefore held fixed while the table 23 is moved relative to these fixed elements to provide a scanning action of the sample radiograph 26 relative to the beam.

The detector 13 further includes a read out system 28 which acts to read out and store the amplitude signals emitted by the detector elements in response to the amplitude of the light received thereby. The light source is controlled by a pulse system 29 which acts to generate a pulsed or strobed effect in the laser source so that the beam 19 is of a pulsed nature. The drive system 27, readout system 28, and pulse system 29 are all controlled by the central computer control system 10. The light source 11, sample support table 12 and the detector 13 are all mounted in a closed enclosure 30 which is arranged to exclude ambient light.

The radiograph is placed on the table 23 in the transparent aperture 24. The collimated laser line source, located under the radiograph illuminates the radiograph. With the illuminating line on the radiograph aligned parallel to the CCD array 13, the plane formed by the illuminating line and the linear array will be approximately perpendicular to the X-axis of the table 23. The use of collimated laser light illumination eliminates scattered diffusing light inherent to the case when a non-collimated light source is used.

The CCD camera consists of a linear CCD array with the number of elements depending on the availability, spatial resolution and size of the radiograph. For instance a 2048 or 5000 element linear CCD array with corresponding spatial resolution of 14 or 7 $\mu m$ respectively is sufficient for a dental radiograph digitizer. The radiograph image is digitized by controlling the table movement.

The table and the CCD camera is surrounded by the enclosure 30 so that no ambient light falls on the radiograph. When the table 23 is moved to the proper position indicated by the encoder output, the laser strobing pulse is generated from the computer, so that the radiograph is illuminated for a short duration only, say a few microseconds. The CCD array is read at the end of strobing pulse and its output signal is converted to the digital signal and stored in the memory of the control system 10 through an Analog to Digital Converter and FIFO (First-in-first-out) memory. Subsequent table movement to the next position which is exactly one effective pixel away from the previous position initiates the next laser strobing pulse and another set of measurements. In this fashion, the radiographic image is digitized line by line.

All commercially available CCD linear array with aspect ratio of 1:1 (square element) has element size typically in the range of 7 to 20 $\mu m$, If the radiograph is digitized directly without magnification, the digitized image spatial resolution is equal to the element size. For instance, a 2048 element linear array with 14 $\mu m$ square element covers 28.672 mm which is almost equal the width of regular dental radiographs. The X-axis movement step size in this case is 14 $\mu m$. If a higher spatial resolution at the region of interest (ROI)is required, an appropriate magnifying lens, say a factor of 4, is used and the ROI will be digitized with spatial resolution of 3.5 $\mu m$. In this case the X-axis movement step size is automatically adjusted to 3.5 $\mu m$. In general the stepping motor step size (or the encoder resolution whichever is the largest) of 0.25 $\mu m$ is sufficient for all practical purpose.

The table 23 has two movement modes: the move-stop mode and the continuous mode. Whereas there is no table movement when the laser is on for the move-stop mode, the continuous mode is a modulated continuous movement, i.e. the table 23 moves fast when the CCD array is read and slowly when the illuminating laser is on. The laser strobing pulse is therefore short enough to ensure that the X-table moves less than 1/10 pixel or less during the illuminating time interval. All the timing signals are generated from the data acquisition board. In both cases, the amount of movement between pulses is equal to the transverse dimension of the CCD detector elements.

This technology is designed to provide a self-contained user-friendly system requiring no prior operator training. Controlled from a keyboard or 'mouse', the device is designed to automatically digitize and enhance a radiograph in a period of 2-4 minutes. The resultant enhanced images are then printed in black/white or color to facilitate patient communication and allow the dentist to obtain greater diagnostic precision compared with traditional enhanced radiographic evaluations. Facilities for CD ROM image storage can also be built into the system if it is desired.

The system has following advantages when compared to a conventional video camera or machine vision camera system:

(i). Low cost

A 2048 element CCD linear array costs approximately $500 or less, whereas an equivalent 2048×2048 area array will cost more than $10,000.

(ii). Availability 5,000 or 7,000 element CCD linear array is commercially available. The largest reported area array is 5120×5120 with element size 12 mm.

(iii). Large dynamic range, low noise

The dynamic range of a linear array is typically around 10,000:1 or more which is more than three times than the area array. Moreover, strobing laser light illumination eliminates the scattered diffusing light and short delay time, approximately 0.06 msec, between the exposure and the reading of last CCD element reduces the dark current. Both factors effectively increase the dynamic range. The dark current can even be reduced further by subtracting the typical dark current store in the memory from the signal.

(iv). High image fidelity

Parallel laser light illumination, no ambient light measurement environment and computer controlled precision scanning table eliminate all distortions suffered by the commercial image scanning system (such as Model CID 3515, Barneyscan, Berkeley, Calif., U.S.A.) used for desk publishing. Moreover the CCD array non-uniform and non-linear output voltage with respect to the incident light intensity can be easily minimized by using each element calibration data stored in the computer.

(v). Accuracy

The system does not suffer timing errors that always exist in video cameras without very sophisticated electronic circuitry. Zero element defect is readily available for a linear array whereas the defect rate of a large area array is very high.

(vi). Versatility

The system can readily improve the spatial resolution by changing the lens system and the spatial relationship between two digitized radiographs with different resolution is known.

Since various modifications can be made in our invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A method for converting a conventional dental radiograph into a digital image comprising generating a beam of light from a laser source in the form of a line of a predetermined length with the light being emitted from the line substantially in a single plane containing the line and in a direction at right angles to the line such that the light is collimated, generating a series of sequential pulses of the beam, passing the pulses of the beam of light through the radiograph in a direction substantially at right-angles thereto from one side thereof, providing a detector on an opposed side of the radiograph in the form of a single linear array of CCD detector elements lying in said plane, enclosing the source, radiograph and detector in an enclosure to exclude ambient light, causing the CCD detector elements to respond to the light pulses from the beam passing through the radiograph at the end of each pulse to emit a digital signal proportional to an amplitude of the light detected, generating relative movement between one element including the radiograph and a second element including the array and the beam such that the beam and the array are scanned across the radiograph, and storing the digital signals emitted by the detector elements in signal reading means to generate said digital image.

2. The method according to claim 1 wherein the radiograph has a width which is approximately equal to the length of the array.

3. The method according to claim 1 wherein the relative movement is stepped and the amplitude of the light detected is detected by the CCD detector elements during each step.

4. The method according to claim 1 wherein the relative movement is continuous.

5. The method according to claim 4 wherein the movement between two sequential measurements is equal to the transverse dimension of the detector elements.

6. An apparatus for converting a conventional dental radiograph into a digital image comprising light source means for generating a beam of light from a laser source in the form of a line of a predetermined length with the light being emitted from the line substantially in a single plane containing the line and in a direction at right angles to the line such that the light is collimated, said light source means including means for generating a series of sequential pulses of the beam, means for mounting the radiograph for passing the pulses of the beam of light through the radiograph in a direction substantially at right-angles thereto from one side thereof, detector on an opposed side of the radiograph in the form of a single linear array of detector elements lying in said plane, an enclosure enclosing the light source means, the radiograph and the detector to exclude ambient light, the CCD detectors being arranged to respond to the light pulses of the beam passing through the radiograph at the end of each pulse to emit a digital signal proportional to an amplitude of the light detected, means for generating relative movement between one element including the radiograph and a second element including the array and the beam such that the beam and the array are scanned across the radiograph, and signal reading means for storing the digital signals emitted by the detector elements to generate said digital image.

7. The apparatus according to claim 6 wherein the radiograph has a width which is approximately equal to the length of the array.

8. The apparatus according to claim 6 wherein the means for generating relative movement is arranged such that the movement stepped and the amplitude of the light is detected by the CCD detector elements during each step.

9. The apparatus according to claim 6 wherein the relative movement is continuous.

10. The apparatus according to claim 9 wherein the pulses of the beam are arranged relative to the means for generating relative movement such that the amount of movement between two sequential measurements is equal to the transverse dimension of the detector elements.

* * * * *